US005740061A

United States Patent [19]
Dewey et al.

[11] Patent Number: 5,740,061
[45] Date of Patent: Apr. 14, 1998

[54] CARTRIDGE SHIFTING OPTIMIZATION IN A SUPER LIBRARY

[75] Inventors: Douglas William Dewey; Kamal Emile Dimitri; Barbara Ann McNaughton; Rodney Jerome Means; Daniel James Winarski, all of Tucson, Ariz.

[73] Assignee: International Business Machines Corporation, Armonk, N.Y.

[21] Appl. No.: 864,181

[22] Filed: May 28, 1997

Related U.S. Application Data

[63] Continuation of Ser. No. 451,388, May 26, 1995, abandoned.

[51] Int. Cl.⁶ ............................ G06F 17/00; G06G 7/48
[52] U.S. Cl. .............................. 364/478.02; 414/273
[58] Field of Search ........................ 364/478.02, 200; 360/92; 395/82, 800, 656, 478; 414/280, 277

[56] References Cited

U.S. PATENT DOCUMENTS

| | | | |
|---|---|---|---|
| 4,771,375 | 9/1988 | Belgin et al. | 364/200 |
| 4,864,438 | 9/1989 | Munro | 360/92 |
| 4,864,511 | 9/1989 | Moy et al. | 364/478 |
| 5,164,909 | 11/1992 | Leonhardt et al. | 364/478 |
| 5,239,650 | 8/1993 | Hartung et al. | 395/650 |
| 5,276,867 | 1/1994 | Kenley et al. | 395/600 |
| 5,336,030 | 8/1994 | Ostwald et al. | 414/277 |
| 5,345,350 | 9/1994 | Ellis et al. | 360/92 |
| 5,355,475 | 10/1994 | Tanaka et al. | 395/600 |
| 5,362,192 | 11/1994 | Dang | 414/280 |
| 5,377,121 | 12/1994 | Dimitri et al. | 364/478 |
| 5,418,971 | 5/1995 | Carlson | 395/800 |
| 5,423,018 | 6/1995 | Dang et al. | 395/425 |
| 5,471,561 | 11/1995 | Cowgill et al. | 395/800 |
| 5,479,581 | 12/1995 | Kleinschnitz | 395/82 |
| 5,500,803 | 3/1996 | Munro et al. | 364/478 |
| 5,508,859 | 4/1996 | Hu et al. | 360/92 |

OTHER PUBLICATIONS

"Two Means of Improving Access to the Data in a Library Subsystem", *IBM Technical Disclosure Bulletin*, vol. 33, No. 11, Apr. 1991.

"Automated Cartridge Disposition Promotion (Unload-Least Recently Used to Keep)", *IBM Technical Disclosure Bulletin*, vol. 36, No. 08, Aug. 1993.

*Primary Examiner*—Reba I. Elmore
*Assistant Examiner*—Monica Lewis
*Attorney, Agent, or Firm*—Baker Maxham Jester & Meador

[57] ABSTRACT

A system for optimizing the position and use of cartridges of machine-readable data storage media in an automated super library. The invention is implemented in a super library that includes a main library bin with a plurality of cartridge slots, a picker, and multiple small libraries, where each small library has a small library bin with multiple slots, a picker, and at least one data drive. Mount queue times are estimated for each small library, and a main library picker is selectively operated to transfer cartridges between the small libraries based on the estimated mount queue times. This provides expedited access of the cartridges at the small libraries. The host processor maintains requests for such inter-library transfers in a main picker queue, for processing by the main picker. When each small library has a non-empty mount queue, the main picker processes small libraries' cartridge transfer requests by efficiently distributing cartridges along the small libraries. In addition to these demand-based transfer requests, the main picker regularly performs load-leveling between the small libraries and the main library bin, to ensure that the higher demand cartridges are stored in the small library bins rather than the main library bin. The invention also contemplates one or more priority slots in each small library, to store cartridges designated for high priority use.

52 Claims, 6 Drawing Sheets

CARTRIDGE SHIFTING OPTIMIZATION IN A SUPER LIBRARY

This application is a continuation of application Ser. No. 08/451,388, filed May 26, 1995, now abandoned.

BACKGROUND OF THE INVENTION

1. Field of the Invention

The present invention relates to automated libraries that store cartridges of machine readable data storage media such as tapes or optical disks. More particularly, the invention concerns a method for optimizing the position and use of such cartridges within an automated super library.

2. Description of the Related Art

In most digital data storage systems, computers store data using two techniques. A "dedicated" data storage system includes a data storage medium permanently coupled to a read/write device. One example is a conventional hard drive, in which one or more data storage disks are accessed by corresponding read/write heads. In contrast to the dedicated system, an "interchangeable" data storage system includes a read/write drive that can individually access any data storage media with the proper shape, data storage capacity, and data format. Examples of the interchangeable data storage media include floppy diskettes, magnetic tape, optical cartridges, and various configurations of removable circuit cards.

Dedicated data storage systems typically offer fast access speed for a number of reasons. First, no time is required to couple the media to the drive. Also, the read/write drive and the data storage medium may be manufactured to achieve greater mechanical compatibility, since the system does not have to accommodate the mechanical operations of inserting and removing media.

Despite these advantages, many users prefer interchangeable data storage systems. One advantage of the interchangeable system is data integrity. The interchangeable system is less vulnerable to equipment failures, since the data drive and the data are not integrated. In particular, failure of the read/write drive does not necessarily signal failure of the data storage medium. Another advantage of interchangeable systems is cost effectiveness, since one drive may be used to exchange data with many different data storage media. This often saves money because drives are substantially more expensive than data storage media. In applications requiring more concurrent data access, multiple drives may be used. Although this increases the cost of the system, savings are still achieved in comparison to the dedicated data storage system.

With interchangeable data storage systems, the user must choose some scheme for storing the data storage media and conveying each data medium to a drive. In the simplest situation, a user might store the media in a drawer, and transfer media between the drawer and the drive by hand.

A more automated approach is the modern data "super library", a typical embodiment of which is shown in FIG. 1. In the super library 100, many data storage packages 102 are stored in slots of a main library bin 104. A main picker 106 individually transfers packages 102 between the main library bin 104 and small libraries 112, 116. The main picker 106 can also individually transfer packages 102 between the small libraries 112, 116. The main picker 106 often comprises a robotic arm that moves back and forth along tracks 107.

Each small library 112, 116 includes a number of components: a small library bin to store a relatively small number of packages, a data drive, and a mini picker to transfer packages between the drive and the small library bin. For example, the small library 112 includes a small library bin 113 with multiple slots to contain packages 114, a data drive 108, and a mini picker 118. The small library 116 includes a small library bin 120, a data drive 109, and a mini picker 122. In the case of magnetic tape media, the mini pickers 118, 122 may comprise automated cartridge loaders ("ACLs"), which sequentially advance tape cartridges to a corresponding tape deck.

A host processor 150 manages operation of the main picker 106 and the mini pickers 118, 122. The host processor comprises, for example, a personal or mainframe computer.

Although many users have found known super libraries to be satisfactory for their purposes, the efficiency of known libraries may be improved in a number of respects. First, known mini pickers, such as ACLs, comprise serial-access devices that do not provide random access to a small library's packages. Accordingly, the serial-access picker must cycle through an entire group of packages to reach a desired one of the packages in the group. Additionally, operation of known super libraries is critically affected by the efficiency with which the packages are stored in the small library bins 113, 120. In many cases, known super libraries may perform an excessive number of package transfers. Additionally, if the packages are not properly allocated among the small libraries, one of the small libraries may become overburdened or "drive bound".

SUMMARY OF THE INVENTION

To address these problems, the present inventors have developed a system for optimizing the position and use of data storage packages of machine-readable data storage media in an automated super library. As an example, the data storage packages may comprise cartridges of machine-readable data storage media such as optical disks. The invention is implemented in a super library that includes a main library having a main library bin with a plurality of cartridge slots, and multiple small libraries, each having at least one data drive and a small library bin with multiple slots. In accordance with the invention, local processors estimate mount queue times for each small library, and a host processor operates a main library picker to transfer cartridges between the small libraries based upon the estimated mount queue times.

More particularly, each local processor considers an estimated mount queue time, the remaining processing time for currently mounted cartridges, and the time required to transfer a cartridge between small libraries. With these considerations, the processor determines whether it is efficient to move a pending cartridge from one small library to another. The host processor maintains requests for these demand-based inter-library transfers in a main picker queue, which is processed by the main picker. In addition to these demand-based transfer requests, the main picker performs "load-leveling" between the small library bins and the main library bin to ensure that the higher demand cartridges are stored in the more accessible small libraries rather than the main library bin. The invention also contemplates one or more priority slots in each small library to store cartridges expected to have frequent use.

The invention affords its users with a number of distinctive advantages. First, the host processor ensures that no small library is overloaded by instructing the main picker to transfer cartridges between the small libraries. As a result, there is a minimal wait to access pending cartridges in each small library. Additionally, since the invention provides a high priority slot in each small library, the small library pickers can load such high priority cartridges with a minimum of time. The invention also provides enhanced efficiency because the host processor keeps track of the least frequently (or least recently) used cartridges, as well as the most frequently (or most recently) used cartridges. As a result, the host processor can direct the main picker to exchange cartridges between these small library bins and the main library bin, to ensure that the small libraries contain the cartridges most likely to be used.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Structure

Figure 1:
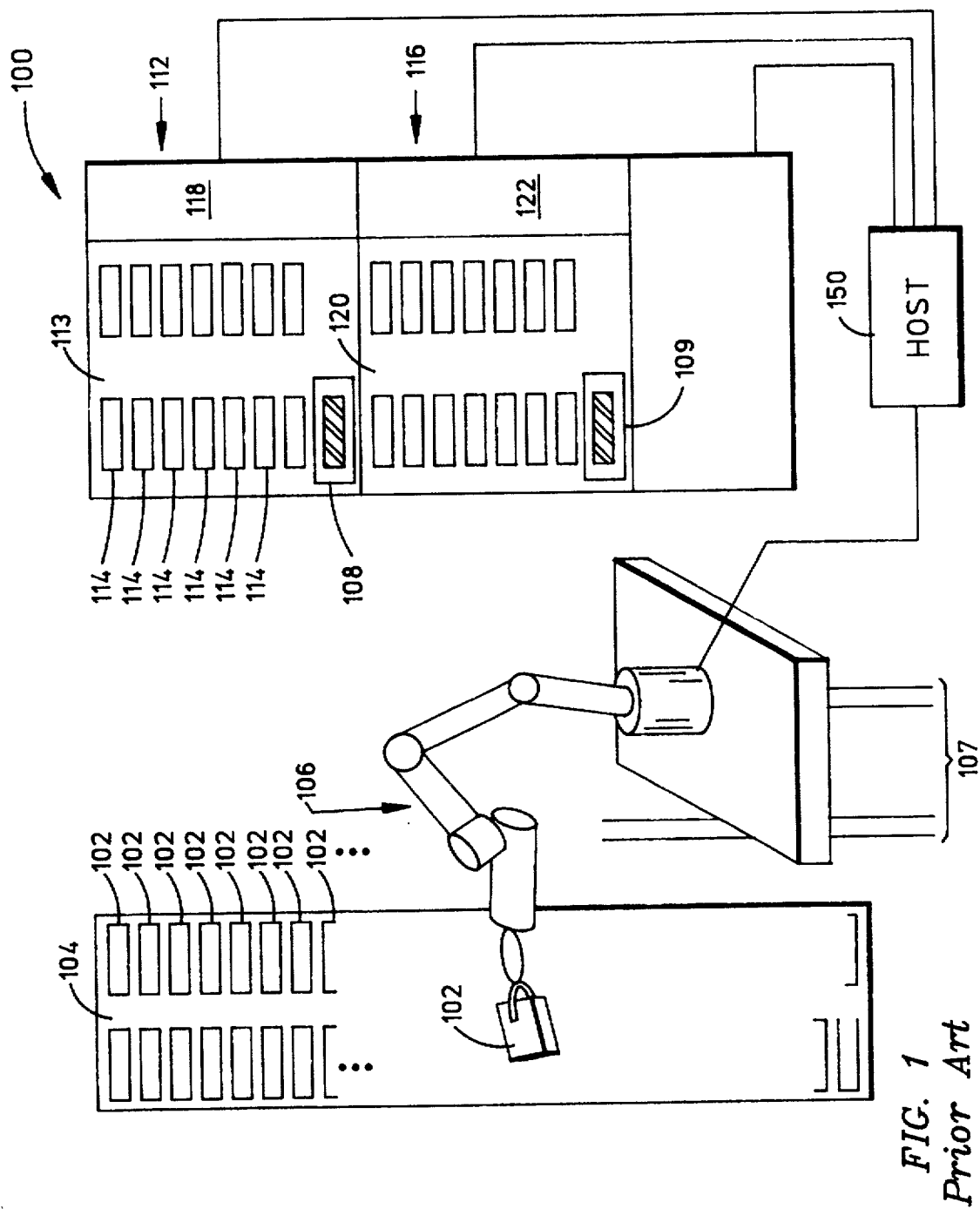
FIG. 1 is a diagram of the hardware components of a known super library 100.

Broadly, the present invention concerns a method to optimize the position and use of cartridges that are provided in an automated super library. For illustrative purposes, the present invention is described in the context of a super library 200, shown in FIG. 2. The super library 200 includes a number of components similar to those of FIG. 1. However, the super library 200 preferably includes a number of improvements over known super libraries. For example, each small library may include multiple drives. For example, the small library 216 includes drives 209–210. Additionally, the mini pickers 218, 222 of the small libraries 212, 216 preferably comprise "random access" pickers capable of transferring any desired cartridge between the drives and slots of their respective small libraries. Moreover, each of the small libraries 212, 216 preferably includes a local processor 230, 240, respectively, to assist in optimizing cartridge use in that small library. Additional small libraries (not shown) may also be provided. Moreover, the small libraries 212, 216 may also include "priority slots" to store extremely active cartridges. For example, the small library 216 includes priority slots 298–299 associated with the drives 209–210, and the small library 212 includes a priority slot 297 associated with the drive 208. The priority slots 297–299 are useful to store frequently used cartridges, because of these slots' proximity to their respective drive.

The invention may be implemented in a super library such as the IBM model 3995 optical library or the IBM model 3495 tape library. The "cartridges" used with the invention may comprise various packages for containing data storage media, and include magnetic tape cartridges, single-disk optical cartridges, multi-disk optical cartridges, and other suitable packages. The invention may also be implemented with certain variations, or with other super libraries. For example, multiple main pickers (not shown) may be used. Furthermore, each main picker may include multiple grippers (not shown) to facilitate the handling of multiple cartridges simultaneously.

General Operation

Figure 3:
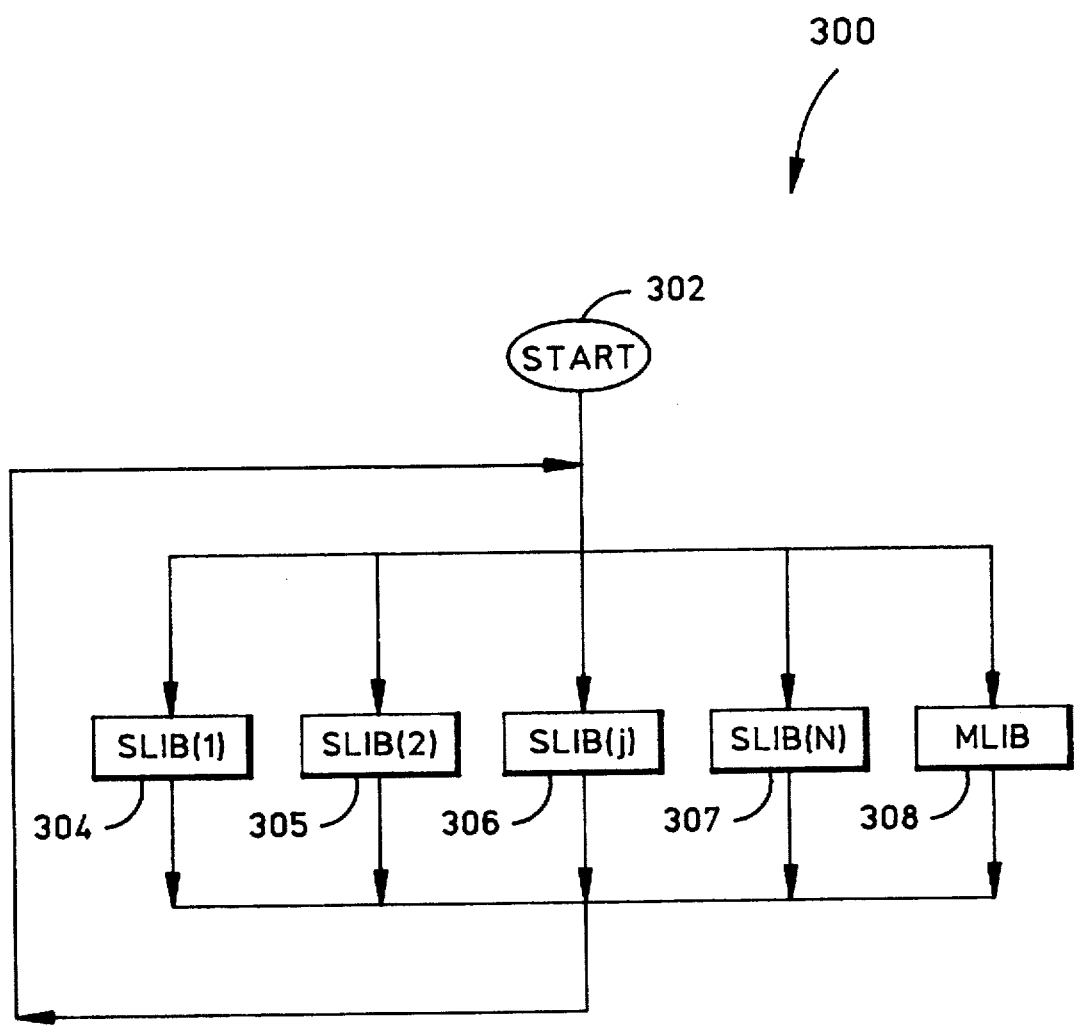
FIG. 3 is a flowchart illustrating an illustrative optimization routine 300 of the invention.

To best describe the overall operation of the super library 200 in accordance with the present invention, reference is made to an optimization routine 300 (FIG. 3). After the routine 300 begins in task 302, multiple subroutines 304–308 are executed continuously. The host processor 250 preferably performs the subroutine 308 ("MLIB") on behalf of the main picker 206 and the main library. Local processors perform the subroutines 304–307 (SLIB(1) –SLIB(N)) on behalf of the corresponding small libraries. For example, the local processor 230 performs the subroutine 304 i.e., (SLIB(1)) on behalf of the small library 212, and so on. Therefore, the small libraries and the main library conduct operations simultaneously. In this context, the present invention provides an advantageous method of operating the mini pickers and the main picker to ensure that the cartridges are stored and transferred efficiently.

Small Library Routines

As mentioned above, each subroutine 304–307 is performed by a different small library. For example, the subroutine 304, referred to as SLIB(1), corresponds to a first small library. The first small library, for example, may comprise the small library 212, top-most in FIG. 2. Similarly, the subroutine 305, referred to as SLIB(2), corresponds to a second small library that may comprise the small library 216, the next-highest small library in FIG. 2. In this example, the number of small libraries is "N", and any given small library may be individually referred to as the jth small library. Thus, the generic subroutine 306 represents a subroutine SLIB(j) of a jth small library. Likewise, the subroutine 307 generically represents a subroutine SLIB(N) of the last small library, the Nth.

Figure 4:
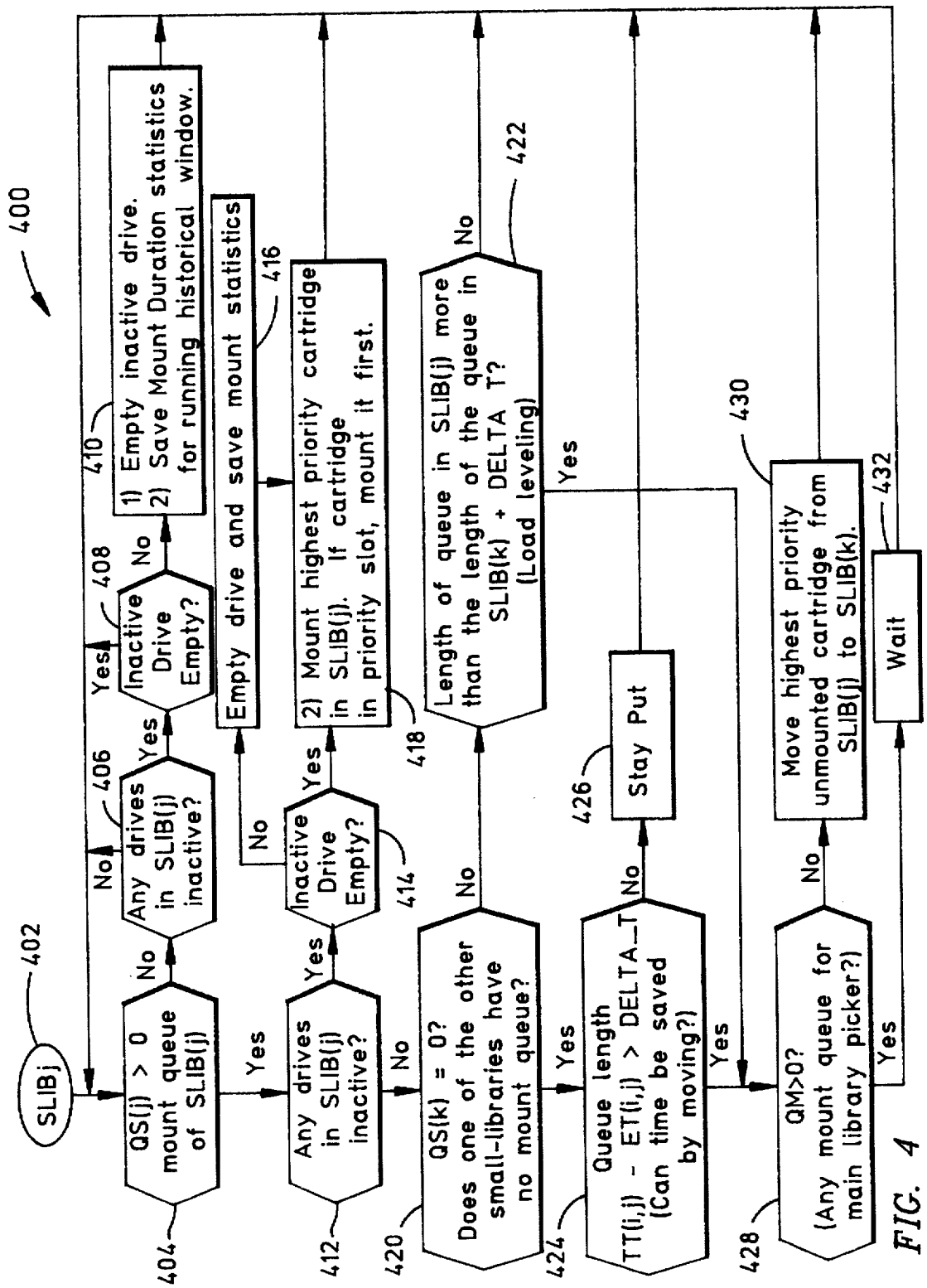
FIG. 4 is a flowchart illustrating the steps 400 of an illustrative small library routine 306 of the invention.

Although the subroutines 304–307 are substantially identical to each other, each subroutine concerns the operation of a different small library. To illustrate the operation of an exemplary small library subroutine in greater detail, reference is made to FIG. 4, which depicts the steps 400 of the subroutine 306 in greater detail. Since the subroutine 306 is performed by the jth small library, this small library is referred to in tasks 400 as the "current" small library. The tasks 400 begin in task 402. First, a query 404 asks whether the "mount queue" of the current small library is empty. The mount queue of a small library comprises a list of cartridges that are waiting to be loaded and accessed by the drive(s) of that small library. The mount queue for a small library may be stored, for example, in memory (not shown) of the small library. Cartridges are listed in a mount queue by the host processor 250 in accordance with the host's data storage and retrieval needs.

Query 404 may be accomplished by determining whether the mathematical relationship of Equation 1 is satisfied:

$$QS(j) > 0 \qquad [1]$$

where:

QS(j) refers to the length of mount queue for the jth small library. If a small library has multiple drives, the mount queue refers to the number of cartridges that are currently waiting to be accessed by the small library picker.

If query 404 determines that the jth small library's mount queue is empty, control passes to query 406, which asks whether any drives in SLIB(j) are inactive. An "inactive" drive is one that is not presently conducting read or write operations; an inactive drive may still contain a cartridge, and therefore is not necessarily empty. If no drives of SLIB(j) are inactive, control is passed back to query 404. However, if SLIB(j) has an inactive drive(s), query 408 determines whether the inactive drive(s) is empty. If the inactive drives are already empty, control returns to query 404. On the other hand, if query 408 determines that one or more of the inactive drives are not empty, task 410 empties the inactive drives and saves certain "mount duration statistics" for the inactive drives. Specifically, in task 410 the mini picker of SLIB(j) empties the inactive cartridges from their respective drives, and returns the cartridges to appropriate slots in the small libraries. The "mount duration statistics" specify information such as the length of time that the cartridges were present in their respective drives, and the number of accesses that the drives performed on these cartridges. As an example, the mount duration statistics may be saved for the entire lifespan of a cartridge in the super library 200. Alternatively, the mount duration statistics may be maintained for a running historical window, i.e., from a selected time in the past to the present time. The mount duration statistics may be maintained, for example, by the host 250 or by the local processors 230, 240. After task 410, control returns to query 404. Accordingly, steps 404, 406, 408, and 410 operate to empty cartridges from inactive drives of SLIB(j) when the mount queue of that small library is empty.

Figure 2:
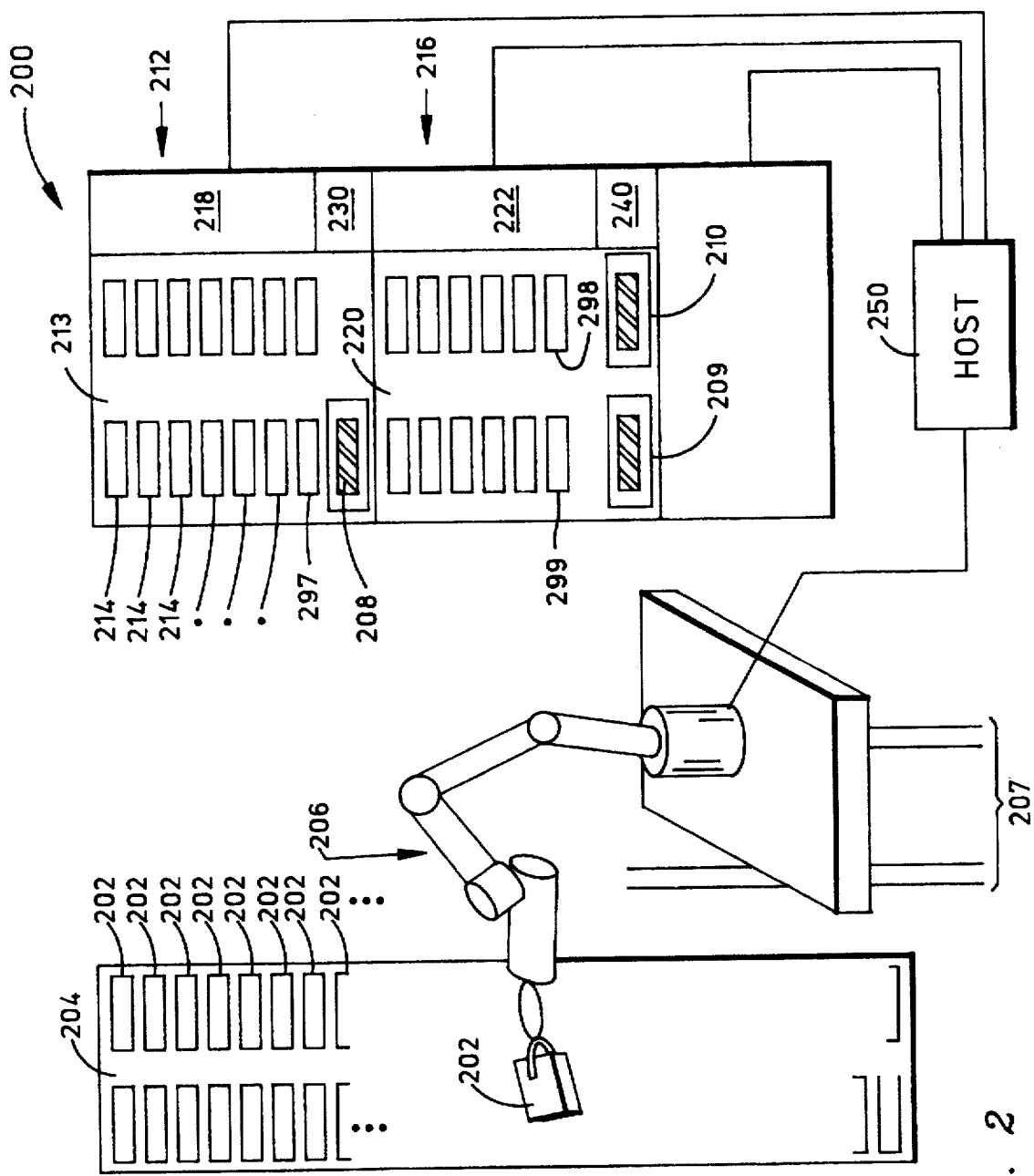
FIG. 2 is a diagram of the hardware components of a super library 200 in accordance with the present invention.

If query 404 determines that the mount queue of SLIB(j) is not empty, control advances to query 412, which asks whether any drives of SLIB(j) are inactive. If so, query 414 asks whether any of the inactive drives are empty. For each inactive drive that is not empty, task 416 empties the drive and saves its mount duration statistics, similar to task 410 discussed above. If query 414 determines that an inactive drive is already empty, task 418 mounts a selected cartridge in that drive. The selected cartridge may comprise, for example, the next cartridge in the drive's mount queue. If SLIB(j) includes a "priority slot", task 418 automatically mounts the cartridge contained in that slot. As mentioned above, a priority slot is a cartridge slot physically located near the drive, to facilitate quick mounting of a cartridge stored in that slot, such as slots 297–299 (FIG. 2). After task 418, control returns to query 404. Summarizing, steps 412, 414, 416, and 418 operate, if SLIB(j) has a non-empty mount queue, to empty the inactive drives of SLIB(j) and mount high priority cartridges in these drives.

If query 412 finds that all drives in SLIB(j) are active, query 420 asks whether any other small library (i.e., other than SLIB(j)) has an empty mount queue. This is accomplished by determining whether the relationship of Equation 2 (below) is satisfied:

$$QS(k)=0 \qquad [2]$$

where:
k designates another small libraries, other than the jth small library (i.e., k≠j).

If the other small libraries have non-empty mount queues, control proceeds to query 422. Query 422 compares the length of the queue in SLIB(j) to the length of the queue in the other small libraries. For each of the other small libraries, query 422 asks whether the queue length of SLIB(j) is greater than the queue length of that small library added to the time required to transfer a cartridge to that small library. If another small library has a shorter queue than SLIB(j), it would be more efficient to abort a transfer and process the cartridges in SLIB(j) if SLIB(j) could mount the cartridge (after SLIB(j)'s mount queue expires) faster than the cartridge could be transferred to the other small library and mounted (after that library's mount queue expires). Query 422 maybe answered by asking whether the mathematical relationship of Equation 3 (below) is satisfied:

$$QL(j)>QL(k)+DELTA\_T \qquad [3]$$

where:
QL(j) represents the length of the mount queue of SLIB (j);

QL(k) represents the mount queue length of another small library, the kth small library; and DELTA_T represents the time required to mechanically transfer a cartridge from SLIB(j) to SLIB(k) and to mount the cartridge in SLIB(k).

DELTA_T may be determined in accordance with the Equation 4, shown below.

$$DELTA\_T=T_{LP}-T_{SP} \qquad [4]$$

where:
$T_{LP}$=the mechanical time for the main picker 206 to transfer a cartridge between small libraries, plus the time for the mini picker of SLIB(k) to mount that cartridge in SLIB(k); and $T_{SP}$=the mechanical time for the mini picker (e.g., 218) of SLIB(k) to select and mount a cartridge in SLIB(k).

If desired, DELTA_T maybe increased to prevent mechanical "thrashing". Thrashing refers to the condition where a picker repeatedly moves a cartridge between two small libraries, to save a relatively small amount of time. For example, DELTA_T may be sufficiently increased by doubling it, or by multiplying it by another integer. Thrashing, therefore, may be avoided by increasing DELTA_T as necessary.

If the queue length of SLIB(j) is not greater than each of the other small libraries' queue lengths plus the relevant inter-library cartridge transfer time, query 422 answers "no" and passes control back to query 404. On the other hand, control advances to query 428 in the event query 422 determines that the cartridge will ultimately be loaded more quickly by transferring it to another small library. Query 428 is discussed in greater detail below.

Query 424 is performed if the mount queue of SLIB(j) is non-empty (query 404), and all drives in SLIB(j) are active (query 412), and another small library has an empty mount queue (query 420). Broadly, query 424 asks whether it would be more efficient to (1) transfer the next cartridge in SLIB(j)'s mount queue to another small library found to have an empty mount queue, or (2) wait for processing of the current cartridge in SLIB(j) to complete. In other words, query 424 asks whether time can be saved by moving the next cartridge in SLIB(j)'s mount queue to a different small library. This determination can be made, for example, in accordance with Equation 5, below:

$$TT(i,j)-ET(i,j)>DELTA\_T \qquad [5]$$

where:
TT(i,j) represents the estimated total time of the ith mount in SLIB(j), i.e., until the drive in SLIB(j) is free for the next (i+1) mount;

ET(i,j) is the elapsed time for processing the current job in SLIB(j); this value may be calculated by subtracting the time when the cartridge was first inserted into the drive from the current time.

The value of TT(i,j) may be calculated, for example, by considering certain "historical" data concerning the particular cartridge that is currently mounted. This may be accomplished by maintaining a "running window" indicating the time required for a specific number of most-recent mounts. For example, a list may be maintained to record the access times of the last ten mounts. Alternatively, instead of estimating TT(i,j) historically as shown above, the value of TT(i,j) may be estimated analytically using a relationship such as Equation 6 (below):

$$TT(i,j) = T_{SP} + HR*(ACCESS + X/SDR) + TT(i-1,j) \quad [6]$$

where:

X = the average file size in megabytes per disk surface;

SDR = the "head or spin data rate", indicating the I/O data rate once the file has been opened; in some cases, the value of SDR may be reduced to accommodate control unit overheads, as in cases where there are multiple drives in one small library;

ACCESS = the time required to open a file, close the file, and the associated overhead; this time depends on the type of media and format, as well as the number of files in the volume; and HR = the "hit ratio" (number of files accessed per mount), which may be calculated by a historical average or a running window.

If query 424 determines that time cannot be saved by moving, the next cartridge of SLIB(j) remains there, as indicated by task 426. After task 426, control returns to query 404. However, if query 424 determines .that time can be saved by moving the cartridge to a different small library, query 428 is executed. Query 428 asks whether the main picker 206 has a non-empty mount queue. This determination may be made by asking whether the mathematical relationship of Equation 7 (below) is satisfied:

$$QM > 0 \quad [7]$$

where:

QM represents the mount queue of the main picker 206.

If query 428 determines that the main picker 206 has an empty mount queue, SLIB(j)'s local processor in task 430 transmits a request to the main picker 206 for a "demand-based" cartridge transfer. Particularly, a request is made to move the highest priority unmounted cartridge from SLIB(j) to the target small library identified in query 420 or 422, as applicable. Specifically, in task 430 SLIB(j)'s local processor sends the host 250 its request for the transfer, and the host 250 enters the request in the main picker's (empty) mount queue. The manner in which the main picker processes its mount queue is discussed below. After this request is sent in task 430, control returns to query 404. On the other hand, if query 428 finds that the main picker 206 has a non-empty mount queue, task 432 waits for a predetermined time, and then returns control to query 404.

Main Library Routine

Figure 5:
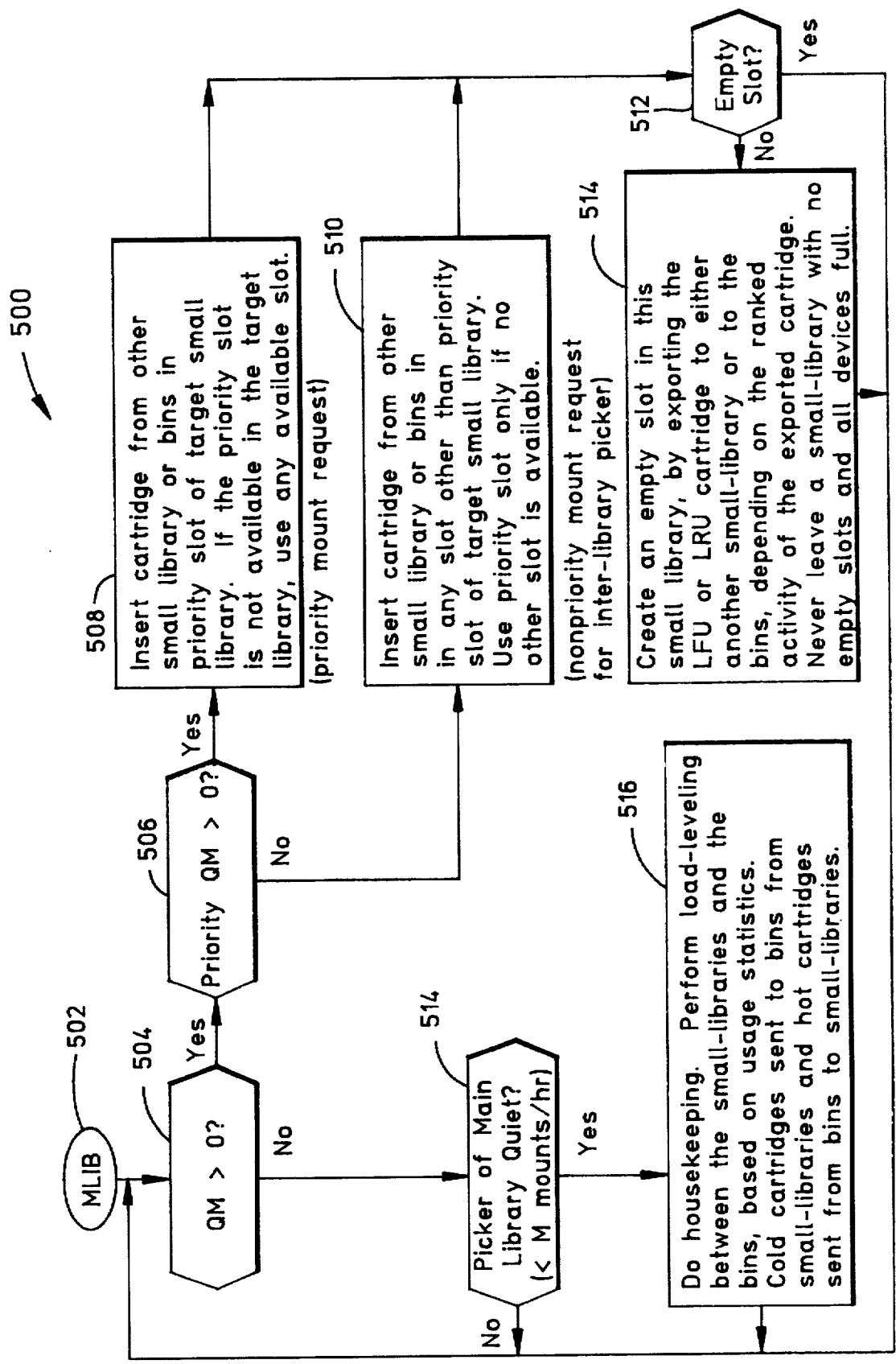
FIG. 5 is a flowchart illustrating the steps 500 of an illustrative main library routine 308 of the invention.

As discussed above, FIG. 4 depicts an exemplary routine 306 that is performed by each of the small libraries; this routine directs the small libraries' pickers to efficiently load and unload cartridges in the small libraries, and also submits requests for the main picker 206 to transfer cartridges between small libraries when appropriate. These requests are processed by the main picker 206 while it operates pursuant to the subroutine 308. The subroutine 308 is described in detail in FIG. 5, which includes a number of tasks 500. The tasks 500 are preferably executed by the host processor 250 to control the main picker 206.

After the routine 500 begins in task 502, query 504 asks whether the mount queue of the main picker 206 is non-empty. The mount queue of the main picker 206 refers to a list of cartridges stored in the main library bin 204 and scheduled for transfer to various small libraries, pursuant to the data access activities of the host 250. For instance, if the host 250 is running an application program that requires data contained on a particular cartridge stored in the main library bin 204, this cartridge is listed in the main picker's mount queue. If query 504 finds that the main picker's mount queue is not empty, control advances to query 506, which asks whether a "priority mount queue" of the main picker 206 is non-empty. The priority mount queue refers a queue of cartridges that have been scheduled for transfer to high priority slots 297-299 from the bin 204 or from another small library. If query 506 determines that the priority mount queue is not empty, task 508 is performed. Specifically, in task 508 the main picker 206 transfers the cartridge named in the priority queue from another small library or the bin 204, as appropriate, to the priority slot (e.g., 297-299) of a target small library. If the priority slot of the target small library is already occupied, the cartridge is transferred to another available slot in that small library. On the other hand, if query 506 determines that the priority mount queue of the main picker 206 is empty, task 510 is performed. In task 510, the main picker 206 transfers a cartridge from another small library or the bin 204 to a non-priority slot of a target small library, as specified by the (non-priority) mount queue.

After a cartridge is transferred to the target library in task 508 or task 510, query 512 asks whether there are any empty slots remaining in the target small library. This inquiry is made to help ensure that each small library always includes at least one empty slot. If all slots of a small library are filled, this would thwart a potential transfer of a cartridge to that small library, and potentially interfere with the efficient operation of the super library 200. If the target small library has one or more empty slots, query 512 directs control to query 504, which is discussed above. However, if no empty slots remain after the transfer of task 508 or task 510, task 514 creates an empty slot in the target small library by transferring a selected cartridge of the target small library to another small library bin or to the main library bin 204. Preferably, this cartridge is selected based on its ranked activity. Specifically, the activity of each cartridge in each small library is ranked with respect to the other cartridges in that small library by the small library's processor. This activity rating may comprise a least-frequently-used criteria, or a least-recently-used criteria, for example. Additionally, the ranking of the cartridge determines whether that cartridge is transferred to another small library or to the bin 204. In particular, a higher-ranked cartridge is transferred to another small library, whereas a relatively lower-ranked cartridge is transferred back to the bin 204 for storage. Accordingly, the cartridge transferred in task 514 is the cartridge with the lowest activity rating. After task 514, control returns to query 504.

The sequence discussed above concerns the scenario where the mount queue of the main picker 206 is not empty. If, on the other hand, query 504 determines that the main picker's mount queue is empty, control passes to query 514 rather than query 506. Query 514 asks whether the main picker 206 is "quiet". The main picker may be considered quiet (or "quiescent"), for example, if the main picker has performed less than a predetermined number of mounts in the past hour. If query 514 determines that the main picker is not quiet, control returns to query 504. On the other hand, if a main picker is deemed by task 514 to be quiet, the routine performs various "housekeeping" activities in task 516. These activities include carrying out demand-based requests for inter-library cartridge transfers, which were submitted by the local processors in task 430. In addition, the main picker 206 may perform various "load-leveling" between the small library bins and the main library bin 204 in accordance with certain complied usage statistics. This load-leveling may involve for example transferring cartridges with lower activity rankings to the bin 204 from the small libraries, and transferring cartridges with higher activity levels from the bin 204 to various small libraries. After task 516 is performed, control returns to query 504.

Processor Operation

As illustrated, the steps 400 and 500 may be implemented by one or more local processors at the small libraries and a processor of the host 250, each of which executes a series of computer-executable instructions. Alternatively, these instructions may be executed by circuitry of one or more small libraries alone, or by circuitry of the host 250 alone.

Figure 6:
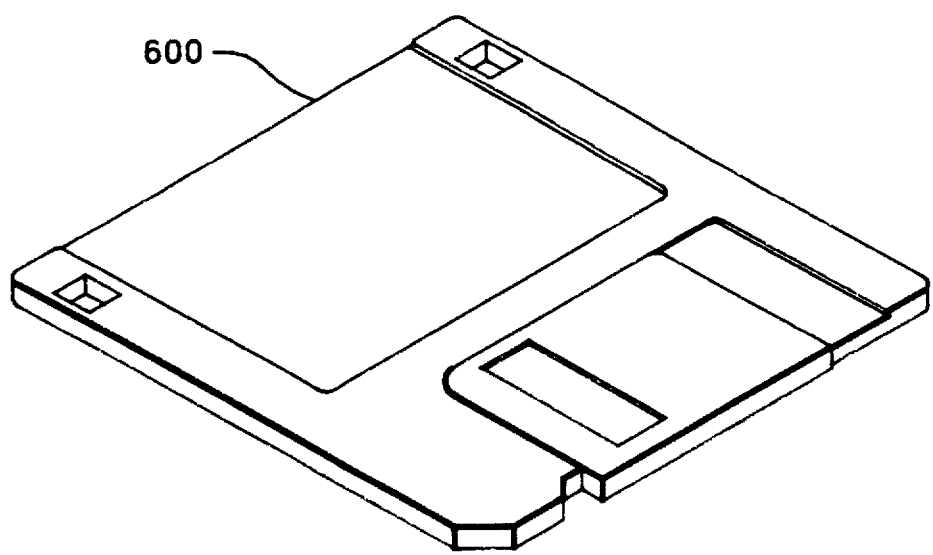
FIG. 6 is a diagram illustrating an exemplary digital data storage device 600 in accordance with the present invention.

The instructions may, for example, reside in RAM associated with the respective processor(s). Alternatively, the instructions may be contained on a data storage device, such as a computer diskette 600 (FIG. 6), for storing machine-readable data. Or, the instructions may also be stored on a DASD array, magnetic tape, conventional "hard drive", electronic read-only memory, optical storage device, paper "punch" cards, or another suitable data storage device. In an illustrative embodiment of the invention, the computer-executable instructions may comprise lines of compiled C language code.

Additional Considerations

If desired, the super library of the invention may be constructed to include small libraries with one or more dual-access slots (not shown). Specifically, each dual-access slot is open at opposite ends, thereby facilitating convenient access by a mini picker as well as the main picker 206. Furthermore, this permits "handoffs" between a mini picker and the main picker 206 via a dual-access slot. In this situation, it is thus possible for a mini picker and the main picker 206 to simultaneously attempt to access the same cartridge stored in a dual-access slot. To avoid such "collisions" between mini pickers and the main picker 206, the small libraries and/or the host 250 may implement the necessary preventative measures. For example, each small library may disable its mini picker during times when the main picker is accessing cartridges of that small library. Alternatively, the host 250 may prevent the main picker from accessing a small library when that small library's mini picker is in motion. Alternatively, a more comprehensive management scheme may be implemented, wherein a mini picker and the main picker are operated concurrently at a small library, but the movement of each picker is choreographed, regulated, or otherwise controlled to prevent collisions.

Furthermore, while there have been shown what are presently considered to be preferred embodiments of the invention, it will be apparent to those skilled in the art that various changes and modifications can be made herein without departing from the scope of the invention as defined by the appended claims.

What is claimed is:

1. A method for efficiently distributing data storage cartridges among multiple small libraries in a super library to reduce wait time prior to access of the cartridges in the small libraries, said super library including a main library with a plurality of cartridge slots, the multiple small libraries, and a main picker to transfer cartridges between the libraries, where each small library includes multiple cartridge slots, at least one data drive, and a mini picker to transfer cartridges between the at least one data drive and the small library's slots, said method comprising the steps of:

each small library receiving a number of cartridges into the cartridge slots of the small library, these cartridges forming a mount queue for the small library, each small library also receiving at least one data exchange request for each cartridge in its mount queue;

estimating a mount queue time for each small library, each said mount queue time comprising a period of time required by the small library to process all cartridges in the small library's mount queue by loading each cartridge to a data drive of the small library, accessing the loaded cartridge to complete the requested data exchanges for the loaded cartridge, and unloading the cartridge from the data drive; and operating the main library picker to transfer cartridges from a first one of the small libraries to a second one of the small libraries, when the estimated mount queue time for the second small library is less than the estimated mount queue time for the first small library.

2. The method of claim 1, further comprising the step of continually repeating the estimating and operating steps during operation of the super library.

3. The method of claim 1, wherein the estimating step comprises the steps of analytically estimating the mount queue times.

4. The method of claim 1, further comprising:

maintaining a record of past mount times of each cartridge in data drives of the small libraries;

for each cartridge, determining a sample mount time having a predetermined relationship to one or more of that cartridge's past mount times; and wherein the estimating step comprises, for each small library, summing the sample mount times for all cartridges in the small library's mount queue.

5. The method of claim 1, further comprising a step of adjusting at least one of the estimated mount queue times to operate the main library picker free from thrashing.

6. The method of claim 1, wherein the operating step comprises the steps of:

estimating a first time that remains in a first small library to process a cartridge mounted therein;

estimating a second time required to transfer the mounted cartridge to a second small library whose mount queue is empty; and operating the main library picker, if the first time is greater than the second time, to transfer at least one cartridge from the first small library to the second small library.

7. The method of claim 1, further comprising the steps of maintaining at least one open slot in each small library.

8. The method of claim 1, further comprising the steps of operating the main picker and the mini pickers to avoid collisions therebetween.

9. The method of claim 8, wherein the steps of operating the main picker and the mini pickers to avoid collisions therebetween comprises steps of preventing the main picker from accessing a small library when that small library's mini picker is in motion.

10. The method of claim 8, wherein the steps of operating the main picker and the mini pickers to avoid collisions therebetween comprises steps of disabling a small library's mini picker when the main picker is accessing that small library.

11. The method of claim 1, wherein the main picker comprises a random access picker.

12. The method of claim 1, wherein the at least one mini picker comprises at least one random access picker.

13. A method for efficiently distributing data storage cartridges among multiple small libraries in a super library to reduce wait time prior to access of the cartridges in the small libraries, said super library including a main library with a plurality of cartridge slots, the multiple small libraries, and a main picker to transfer cartridges between the main library and the small libraries, where each small library includes multiple cartridge slots, at least one data drive, and a mini picker to transfer cartridges between the at least one data drive and the small library's slots said method comprising the steps of:

ranking each cartridge according to its history access by data drives in the super library relative to the other cartridges;

operating the main picker to transfer selected lower-ranked cartridges from small libraries to the main library; and operating the main picker to transfer selected higher-ranked cartridges from the main library to selected small libraries.

14. The method of claim 13, wherein the step of ranking each cartridge comprises the steps of ranking each cartridge according to the frequency, relative to other cartridges, with which that cartridge has been loaded into a small library's drive.

15. The method of claim 13, wherein the step of ranking each cartridge comprises the steps of ranking each cartridge according to the recency, relative to other cartridges, in which that cartridge has been loaded into a small library's drive.

16. The method of claim 13, further comprising the steps of recognizing a quiescent period when activity of the main picker has fallen below a predetermined quiescent level, wherein the steps of operating the main picker to transfer higher-ranked cartridges and lower-ranked cartridges is performed during said quiescent period.

17. The method of claim 13, further comprising the steps of maintaining at least one open slot in each small library.

18. The method of claim 13, further comprising the steps of, in each small library, storing the highest-ranked cartridge in a slot nearest to one of the at least one drive of that small library.

19. The method of claim 13, further comprising the steps of operating the main picker and the mini pickers to avoid collisions therebetween.

20. The method of claim 19, wherein the steps of operating the main picker and the mini pickers to avoid collisions therebetween comprises steps of preventing the main picker from accessing a small library when that small library's mini picker is in motion.

21. The method of claim 19, wherein the steps of operating the main picker and the mini pickers to avoid collisions therebetween comprises steps of disabling a small library's mini picker when the main picker is accessing that small library.

22. The method of claim 13, wherein at least one slot of a selected small library is open at opposite ends, and said method further comprises the steps of operating the main picker and the picker of the selected small library to exchange a cartridge through one of the at least one open slot.

23. The method of claim 13, wherein the main picker comprises a random access picker.

24. The method of claim 13, wherein the at least one mini picker comprises at least one random access picker.

25. A data storage device tangibly embodying a set of machine-readable instructions to perform method steps for optimizing positioning of data storage cartridges in a super library that includes a main library with a plurality of cartridge slots, multiple small libraries, and a main picker to transfer cartridges between the small libraries, where each small library includes multiple cartridge slots, at least one data drive, and a mini picker to transfer cartridges between the at least one data device and the small library's slots, said method steps comprising:

each small library receiving a number of cartridges into the cartridge slots of the small library, these cartridges forming a mount queue for the small library, each small library also receiving at least one data exchange request for each cartridge in its mount queue;

estimating a mount queue time for each small library, each said mount queue time comprising a period of time required by the small library to process all cartridges in the small library's mount queue by loading each cartridge to a data drive of the small library, accessing the loaded cartridge to complete the requested data exchanges for the loaded cartridge, and unloading the cartridge from the data drive; and operating the main library picker to transfer cartridges from a first one of the small libraries to a second one of the small libraries, when the estimated mount queue time for the second small library is less than the estimated mount queue time for the first small library.

26. The device of claim 25, further embodying machine-readable instructions to perform method steps comprising continually repeating the estimating and operating steps during operation of the super library.

27. The device of claim 25, wherein the method step of estimating comprises the steps of analytically estimating the mount queue times.

28. The device of claim 1, further comprising:

maintaining a record of past mount times of each cartridge in data drives of the small libraries;

for each cartridge, determining a sample mount time having a predetermined relationship to one or more of that cartridge's past mount times; and wherein the estimating step comprises for each small library, summing the sample mount times for all cartridges in the small library's mount queue.

29. The device of claim 25, further embodying machine-readable instructions to perform method steps comprising adjusting at least one of the estimated mount queue times to operate the main library picker free from thrashing.

30. The device of claim 25, wherein the method step of operating comprises the steps of:

estimating a first time that remains in a first small library to process a cartridge mounted therein;

estimating a second time required to transfer the mounted cartridge to a second small library whose mount queue is empty; and operating the main library picker, if the first time is greater than the second time, to transfer at least one cartridge from the first small library to the second small library.

31. The device of claim 25, further embodying machine-readable instructions to perform method steps comprising maintaining at least one open slot in each small library.

32. The device of claim 25, further embodying machine-readable instructions to perform method steps comprising operating the main picker and the mini pickers to avoid collisions therebetween.

33. The device of claim 32, wherein the method steps of operating the main picker and the mini pickers to avoid collisions therebetween comprises steps of preventing the main picker from accessing a small library when that small library's mini picker is in motion.

34. The device of claim 32, wherein the method steps of operating the main picker and the mini pickers to avoid collisions therebetween comprises steps of disabling a small library's mini picker when the main picker is accessing that small library.

35. The device of claim 25, wherein the main picker comprises a random access picker.

36. The device of claim 25, wherein the at least one mini picker comprises at least one random access picker.

37. A data storage device tangibly embodying a set of machine-readable instructions to perform method steps for efficiently distributing data storage cartridges among multiple small libraries in a super library to reduce wait time prior to access of the cartridges in the small libraries, said super library including a main library with a plurality of cartridge slots, the multiple small libraries, and a main picker to transfer cartridges between the libraries, where each small library includes multiple cartridge slots, at least one data drive, and a mini picker to transfer cartridges between the at least one data device and the small library's slots said method steps comprising:

ranking each cartridge according to its history of access by data drives in the super library relative to the other cartridges;

operating the main picker to transfer selected lower-ranked cartridges from small libraries to the main library; and operating the main picker to transfer selected higher-ranked cartridges from the main library to selected small libraries.

38. The device of claim 37, wherein the method step of ranking each cartridge comprises the steps of ranking each cartridge according to the frequency, relative to other cartridges, with which that cartridge has been loaded into a small library's drive.

39. The device of claim 37, wherein the method step of ranking each cartridge comprises the steps of ranking each cartridge according to the recency, relative to other cartridges, in which that cartridge has been loaded into a small library's drive.

40. The device of claim 37, further embodying machine-readable instructions to perform method steps comprising recognizing a quiescent period when activity of the main picker has fallen below a predetermined quiescent level, wherein the steps of operating the main picker to transfer higher-ranked cartridges and lower-ranked cartridges is performed during said quiescent period.

41. The device of claim 37, further embodying machine-readable instructions to perform method steps comprising maintaining at least one open slot in each small library.

42. The device of claim 37, further embodying machine-readable instructions to perform method steps comprising, in each small library, storing the highest-ranked cartridge in a slot nearest to one of the at least one drive of that small library.

43. The device of claim 37, further embodying machine-readable instructions to perform method steps comprising operating the main picker and the mini pickers to avoid collisions therebetween.

44. The device of claim 43, wherein the method steps of operating the main picker and the mini pickers to avoid collisions therebetween comprises steps of preventing the main picker from accessing a small library when that small library's mini picker is in motion.

45. The device of claim 43, wherein the method steps of operating the main picker and the mini pickers to avoid collisions therebetween comprises steps of disabling a small library's mini picker when the main picker is accessing that small library.

46. The device of claim 37, wherein at least one slot of a selected small library is open at opposite ends, said device further embodying machine-readable instructions to perform method steps comprising operating the main picker and the picker of the selected small library to exchange a cartridge through one of the at least one open slot.

47. The device of claim 37, wherein the main picker comprises a random access picker.

48. The device of claim 37, wherein the at least one mini picker comprises at least one random access picker.

49. The method of claim 3, the steps of analytically estimating the mount queue times comprising:

maintaining a record of statistics concerning previous mounts of the cartridges to data drives;

for each cartridge in a small library's mount queue, performing a predetermined comparison of the recorded statistics with predetermined characteristics of the cartridge to predict a mount time of the cartridge; and summing predicted mount times for all cartridges in the small library's mount queue.

50. The method of claim 49, the statistics including at least one of the following:

sizes of files accessed during the previous mount, a number of files accessed per mount, a cartridge loading time, a cartridge unloading time, a data exchange rate with the cartridge.

51. The data storage device of claim 27, the steps of analytically estimating the mount queue times comprising:

maintaining a record of statistics concerning previous mounts of the cartridges to data drives;

for each cartridge in a small library's mount queue, performing a predetermined comparison of the recorded statistics with predetermined characteristics of the cartridge to predict a mount time of the cartridge; and summing predicted mount times for all cartridges in the small library's mount queue.

52. The data storage device of claim 51, the statistics including at least one of the following:

sizes of files accessed during the previous mount, a number of files accessed per mount, a cartridge loading time, a cartridge unloading time, a data exchange rate with the cartridge.

* * * * *

UNITED STATES PATENT AND TRADEMARK OFFICE
CERTIFICATE OF CORRECTION

PATENT NO.  : 5,740,061
DATED       : April 14, 1998
INVENTOR(S) : Dewey et al

It is certified that error appears in the above-indentified patent and that said Letters Patent is hereby corrected as shown below:

Column 11, line 24, please insert --of-- between "history" and "access".

Signed and Sealed this

Eleventh Day of August 1998

Attest:

BRUCE LEHMAN

*Attesting Officer*  *Commissioner of Patents and Trademarks*